May 8, 1934.  S. SYMINGTON  1,958,322
CONVEYER OR SCREENING APPARATUS
Filed Jan. 13, 1932   2 Sheets-Sheet 1
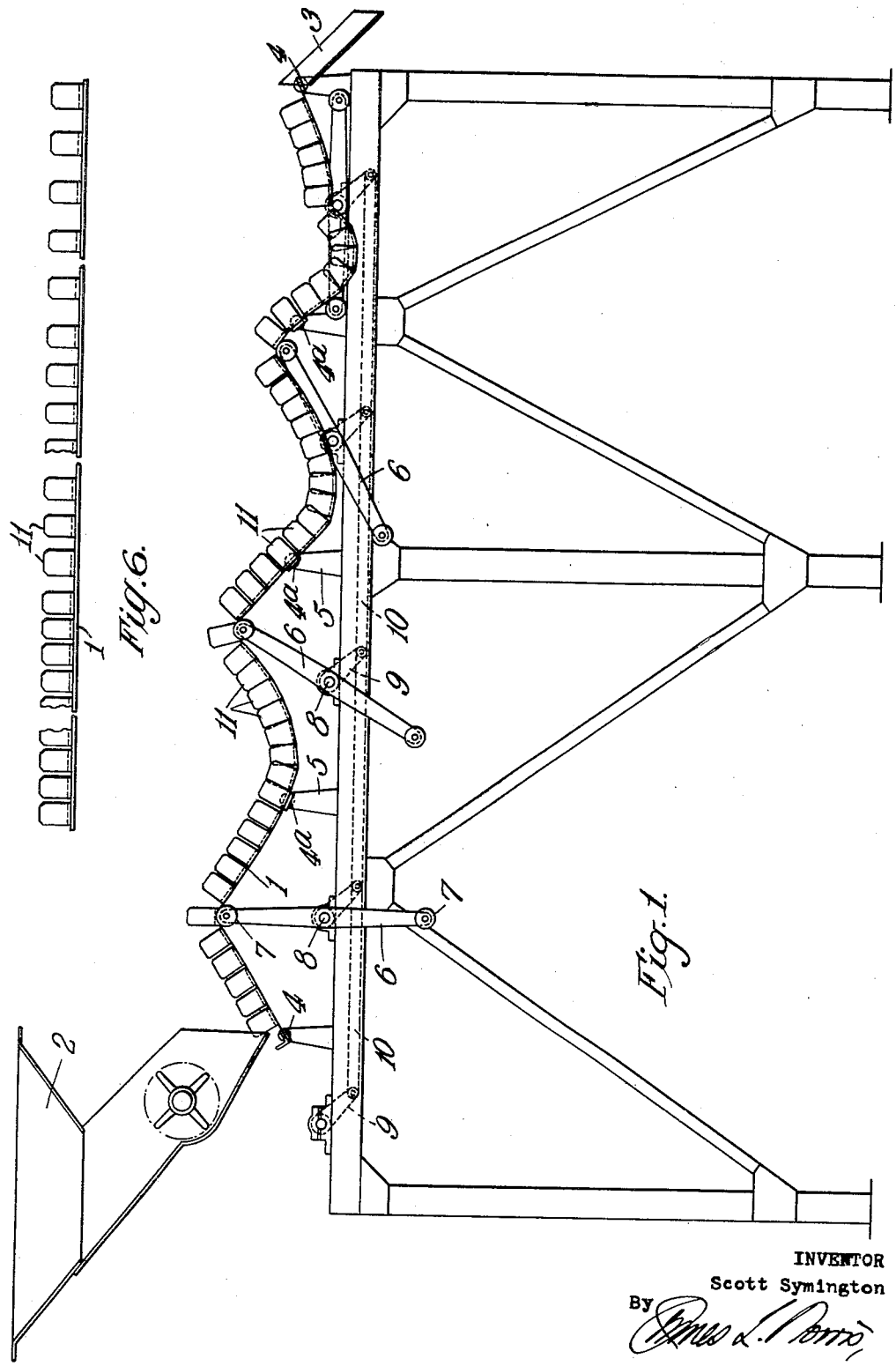
INVENTOR
Scott Symington
By
ATTORNEY May 8, 1934. S. SYMINGTON 1,958,322
CONVEYER OR SCREENING APPARATUS
Filed Jan. 13, 1932 2 Sheets-Sheet 2
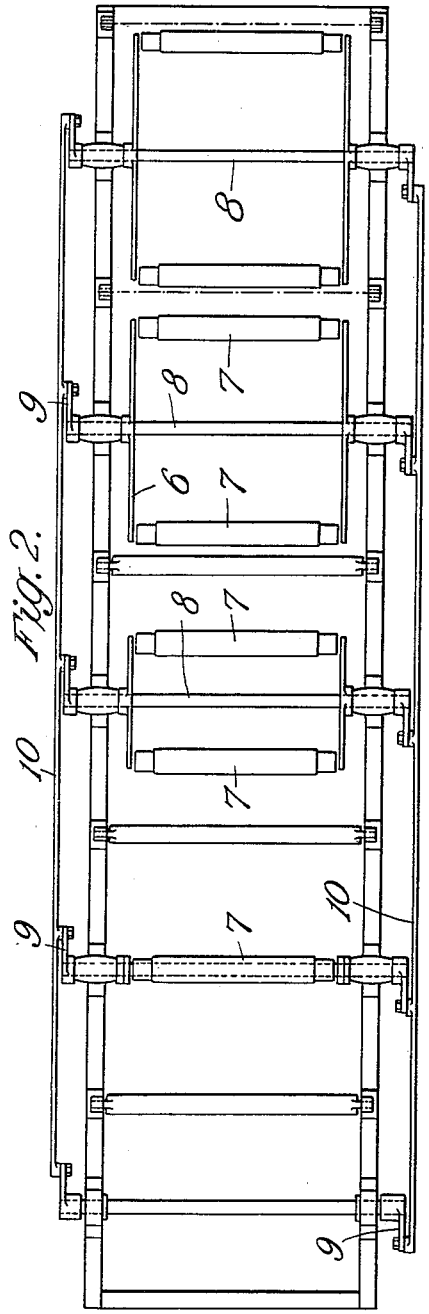
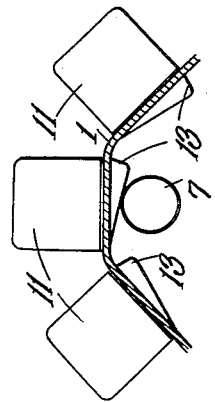
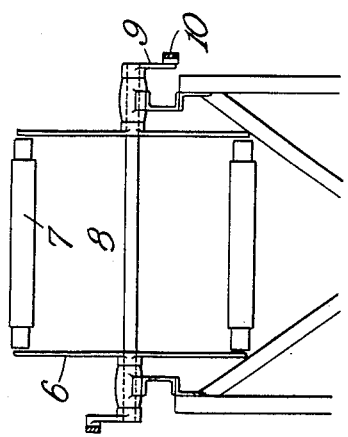
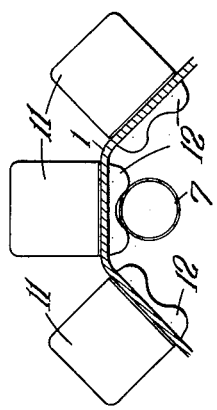
INVENTOR
Scott Symington
By
ATTORNEY Patented May 8, 1934

1,958,322

UNITED STATES PATENT OFFICE 1,958,322

CONVEYER OR SCREENING APPARATUS

Scott Symington, London, England, assignor to Woodall-Duckham (1920) Limited, London, England Application January 13, 1932, Serial No. 586,406
In Great Britain July 14, 1931

3 Claims. (Cl. 209—85)

The primary object of this invention is to provide improved means of screening or classifying solid materials, but the invention is also applicable to the conveyance of materials simply, without any screening or classification thereof.

It will be assumed in the subsequent explanation of the invention that the solid material handled by the apparatus is simultaneously classified or graded and conveyed.

The type of apparatus to which the invention relates comprises a flexible belt or apron which, in the case of screening apparatus, has perforations the size of which may be graded along the length of the belt, but in the case of a simple conveyer the flexible belt or apron is imperforate.

This belt is supported in a sinuous form with alternating troughs and crests and the supports are manipulated in such a way that the troughs are periodically converted into crests and conversely the crests into troughs.

Assuming that the trough at the end of the belt which receives material from a feeding device is filled with solid matter to be classified and/or conveyed and that the supports of the belt are so manipulated that an upwardly directed force is made to act upon the trough at a point located at one side of the centre line of such trough, it follows that the trough will be gradually replaced by a crest and the material will be propelled forward, owing to the gradual formation of the crest immediately behind it.

At the same time the next succeeding crest will be formed into a trough into which the material will fall, with the result that a movement of the material is produced in the direction away from the receiving end of the apparatus, and the material will have moved translationally through a definite distance towards the other end of the belt.

During the next phase a trough will be formed in the belt at its receiving end, and this trough will then be filled with a fresh charge of material, while the first charge which has progressed along the belt will, by the conversion of the trough in which it is carried into a crest, and the conversion of the next succeeding crest into a trough, be spilled into this latter trough and so moved another step towards the discharge end of the belt. If the belt is imperforate, all the material delivered at the receiving end of the belt will be conveyed intermittently along the belt towards its discharge end, but if the belt is perforated part of the material will fall through the perforations into a receiver or receivers for further handling, and, by increasing the cross sectional area of the perforations in the belt from the receiving end to the discharge end, classification of the material into any desired number of grades can be effected.

According to the present invention screening or conveying apparatus of this character is caused to assume a constantly changing sinuous or wave-like form for the purpose of propelling the solid material along it by repeatedly raising and lowering the belt at one or more points along its length by means of one or more transverse members or frames rotating about a fixed axis or axes and adapted to lift and lower successive portions of the conveyer belt.

One way in which the invention may be carried into effect is illustrated in Figs. 1–3 of the accompanying drawings, in which Fig. 1 is a front elevation, partly in section, of a conveying and screening apparatus embodying the invention, Figs. 2 and 3 are, respectively, a plan view and an end view of one means for actuating the conveyer belt, Fig. 4 is a diagrammatic side view, on a scale larger than that of Figures 1 to 3, of portion of a belt carrying rigid elements which form side walls for the belt and have depending projections, Fig. 5 is a view similar to Fig. 4 showing a modified form of side walls for the belt, and Fig. 6 is a side elevation of a portion of a belt having a plurality of side flanges, the interstices between the edges of adjacent flanges being of increasing widths from the receiving end to the discharge end of the belt.

As shown in the drawings, 1 is a flexible conveyer belt which may be perforated for screening purposes. The belt 1 has its receiving and discharging ends attached to transverse bars 4 or the like preferably pivotally mounted adjacent to the feeding hopper 2 and discharge chute 3 respectively. The belt is provided with additional fixed transverse supports 4$^a$ journalled in standards 5, and with rotating supports which preferably take the form of rectangular frames having side members 6 and transverse rollers 7. The rotating supports are mounted on axles 8 which are rotated by a system of cranks 9 and rods 10 operated by any suitable means.

As the frames are rotated in a clockwise direction the transverse rollers 7 will progressively lift successive portions of the belt 1 until a maximum height is reached to form crests in the belt and then progressively lower successive portions of the belt to form a trough, thus creating an ever-changing sinuous or wave-like motion of the conveyer belt.

The rotating members have a cleaning effect on the belt surface. As they sweep round in engagement with the under-side of the belt, they tend to dislodge pieces of material which have become lodged in the perforations of the belt.

Any convenient number of these rotating members may be provided at suitable points along the conveyer, and they may be arranged to rotate in or out of phase with each other, also the rotating members may be arranged to rotate eccentrically.

The flexible belt may be constituted in part by or provided with a series of rigid elements flexibly linked with each other by means of the flexible or belt portion of the conveyer. When the rotating members which produce the constantly changing sinuous form in the flexible belt pass from one such rigid element to another they give a tap or blow to the belt and thereby agitate the material conveyed upon it.

To accentuate such blows the rigid elements may be provided or associated with rigid projections on the under side of the belt the surface of which projections can be given any suitable formation to attain the desired result when the rotating members, as for example the transverse rollers 7 shown in Figs. 1–3, engage the under side of the flexible belt.

These rigid elements may be of such a character and so disposed upon the belt as to serve another function. For example, as shown in Fig. 1, they may consist of plates of stiff material, e. g. iron or steel, secured along the two edges of the belt to prevent spilling of the material carried by the conveyer. Such rigid elements, which are indicated at 11 in Fig. 1, constitute side walls or flanges the edges of which may be adapted to overlap louvre-fashion. It is possible also to arrange these sections 11 in such a way that they can participate in the assortment or classification of the material by offering interstices between their adjacent edges which are not of the same width as shown in Figs. 1, 4 and 5, but are of increasing widths from the receiving towards the discharge end of the belt, as shown in Fig. 6. The material fed to the belt is caused by the wave-like movements imparted to the belt not only to move lengthwise of the belt but also to spread transversely thereof, and consequently the part of such material immediately adjacent the longitudinal edges of the belt will pass through the interstices between the edges of adjacent rigid elements 11.

Figs. 4 and 5 each illustrates diagrammatically a part of the belt carrying rigid elements 11 constituting a side wall or flange, one of which is in engagement with one of the rollers 7. In these figures, the rigid elements 11 are shown as having parts 12 projecting below the under surface of the belt into the path of the roller 7. The surfaces of these projections 12 engaged by the roller may have a curved contour as shown in Fig. 4, or may have a plain inclined surface terminating in a sharp step 13, as shown in Fig. 5, so that the roller, when passing from one such surface to the next, will strike the latter a sharp blow. Obviously, however, such surfaces may take many forms, partly depending upon the character of the rotating member or members by means of which the flexible conveyer is operated.

Having thus described the nature of the said invention and the best means I known of carrying the same into practical effect, I claim:—

1. Screening or conveying apparatus for solid material, comprising a flexible stretch of conveyer belt fixed at each end of its ends and at points between its ends, and means situated between adjacent fixed points and operating alternately to raise and lower successive portions of said belt, said means comprising arms mounted to rotate about fixed transverse axes and transverse supports carried by said arms.

2. Screening or conveying apparatus for solid material, comprising a flexible stretch of conveyer belt fixed at both of its ends, side walls attached to said belt and built up of sections of stiff material, the interstices between successive sections being of increasing widths from the receiving towards the discharge end of the belt, and means for causing the belt to assume a constantly changing wave-like form, said means comprising members rotating about fixed axes and lifting the lowering successive portions of the conveyer belt.

3. Screening or conveying apparatus for solid material, comprising a flexible stretch of conveyer belt fixed at its ends and at points between its ends and sagging between adjacent fixed points, and members rotating about fixed axes below the said belt and adapted to lift and lower the sagging portions of the belt to levels above and below the fixed points thereof.

SCOTT SYMINGTON.